Figure 1:
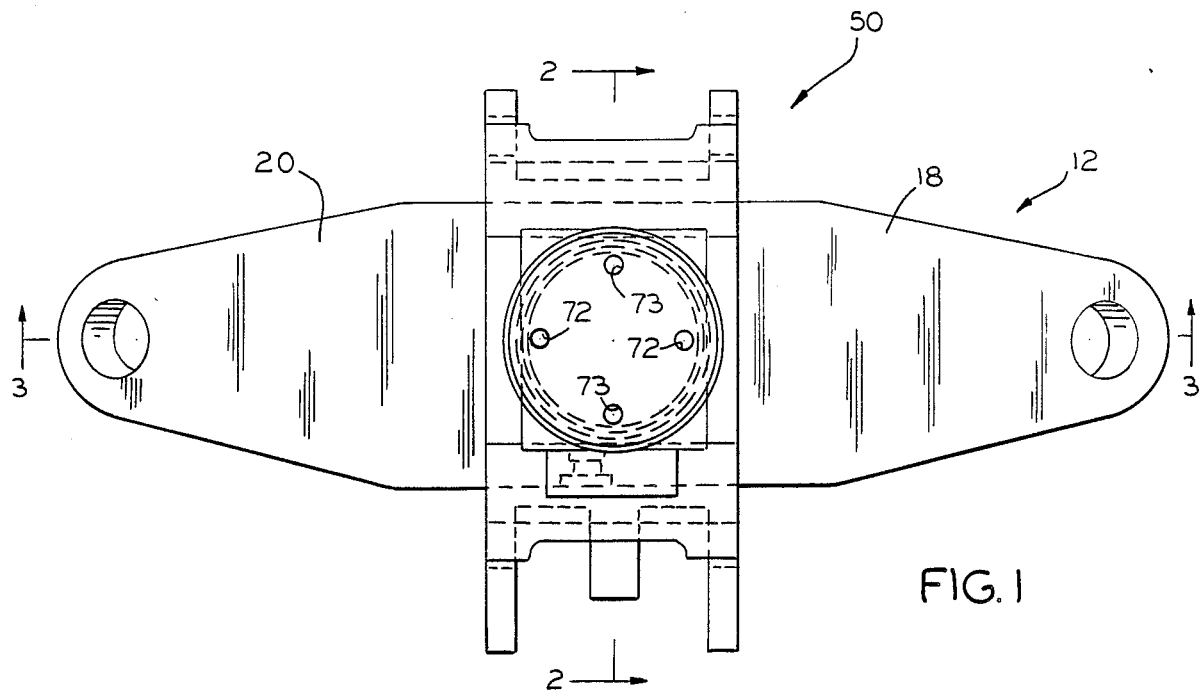

United States Patent [19]

Nordhaus

[11] Patent Number: 4,964,595
[45] Date of Patent: Oct. 23, 1990

[54] ENTRAPPED GAS EJECTOR ARRANGEMENT FOR AIRCRAFT STORE RACKS

[75] Inventor: John P. Nordhaus, Northbrook, Ill.
[73] Assignee: Scot, Inc.
[21] Appl. No.: 329,663
[22] Filed: Mar. 28, 1989
[51] Int. Cl.$^5$ .............................................. B64D 1/08
[52] U.S. Cl. ................................................ 244/137.4
[58] Field of Search ...................... 244/137.4, 137 R; 89/1.57, 1.59; 91/168

[56] References Cited

U.S. PATENT DOCUMENTS

| | | | |
|---|---|---|---|
| 3,677,506 | 7/1972 | La Roe | 244/137 |
| 4,049,222 | 9/1977 | Peterson | 244/137 R |
| 4,050,656 | 9/1977 | Peterson | 244/137 R |
| 4,075,929 | 2/1978 | Peterson | 91/168 |
| 4,088,287 | 5/1978 | Hasquenoph et al. | 244/137 R |
| 4,850,553 | 7/1989 | Takata et al. | 244/137.4 |

OTHER PUBLICATIONS

Technical Manual T.O. 11B29-3-25-2, Pub. 3/26/79, 1st 4 pp. & FIG. 7-4, and pp. 7-19 & 20 introduction, together with Sections I–III/submitted.

Primary Examiner—Charles T. Jordan
Assistant Examiner—Rochelle Lieberman

[57] ABSTRACT

An all ballistic gas actuated ejector arrangement for aircraft store racks that are carried by military type aircraft and the like for releasably attaching to the aircraft stores, such as conventional or nuclear weapons, in which the ejector arrangement is duplicated in mirror image form at the usual fore and aft positions of the rack, with each ejector arrangment being in the form of an elongated housing with which the usual fore and aft sway braces are respectively integral, which ejector housing internally defines an elongate internal chamber in which are slidably mounted, in substantially telescoping coaxial relation with the housing, an outer piston and an inner piston, that in the dormant relation of the ejector are disposed within the ejector housing with like ends of same adjacent the open end of the ejector housing, with the rack ballistic gas being supplied to the other end of the housing, and the ejector outer piston having a ballistic gas receiving chamber and a valve arrangement for entrapping the gas therein for serving to both apply outward thrust to the store through the inner piston while providing cushioning for the inner piston thrust force that is applied to the store, when the ejector is ballistic gas actuated to thrust the store beyond the aircraft's air stream envelope.

7 Claims, 3 Drawing Sheets

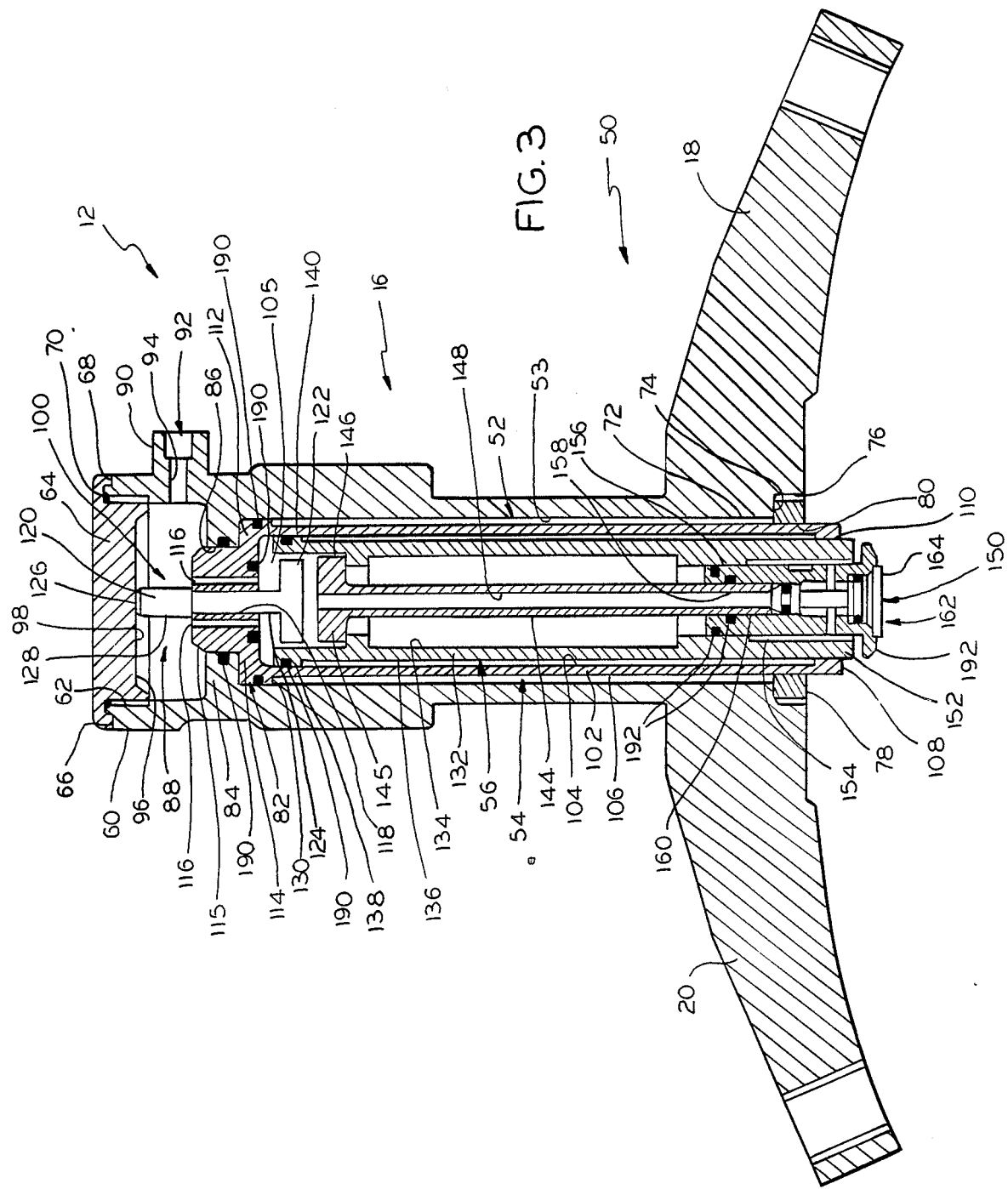

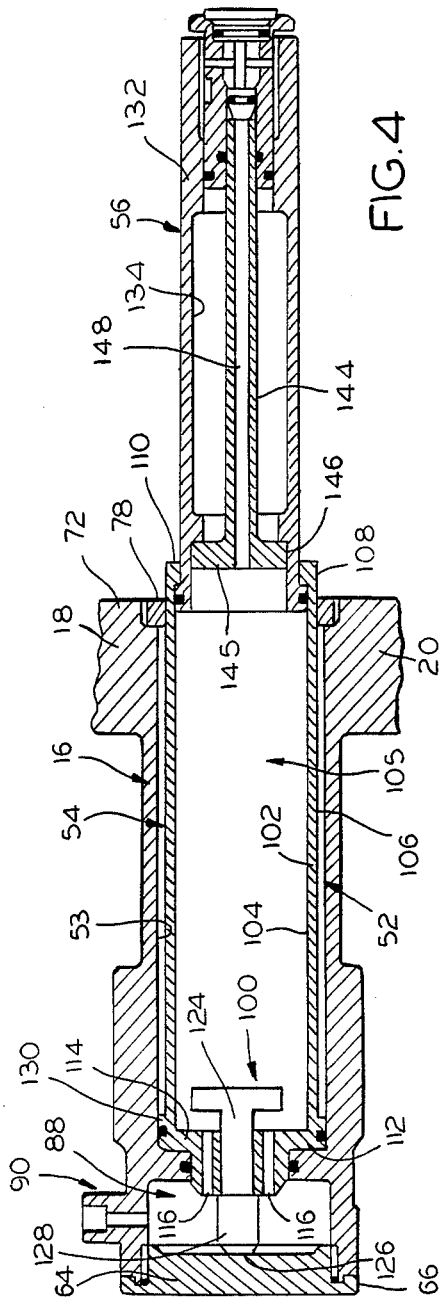
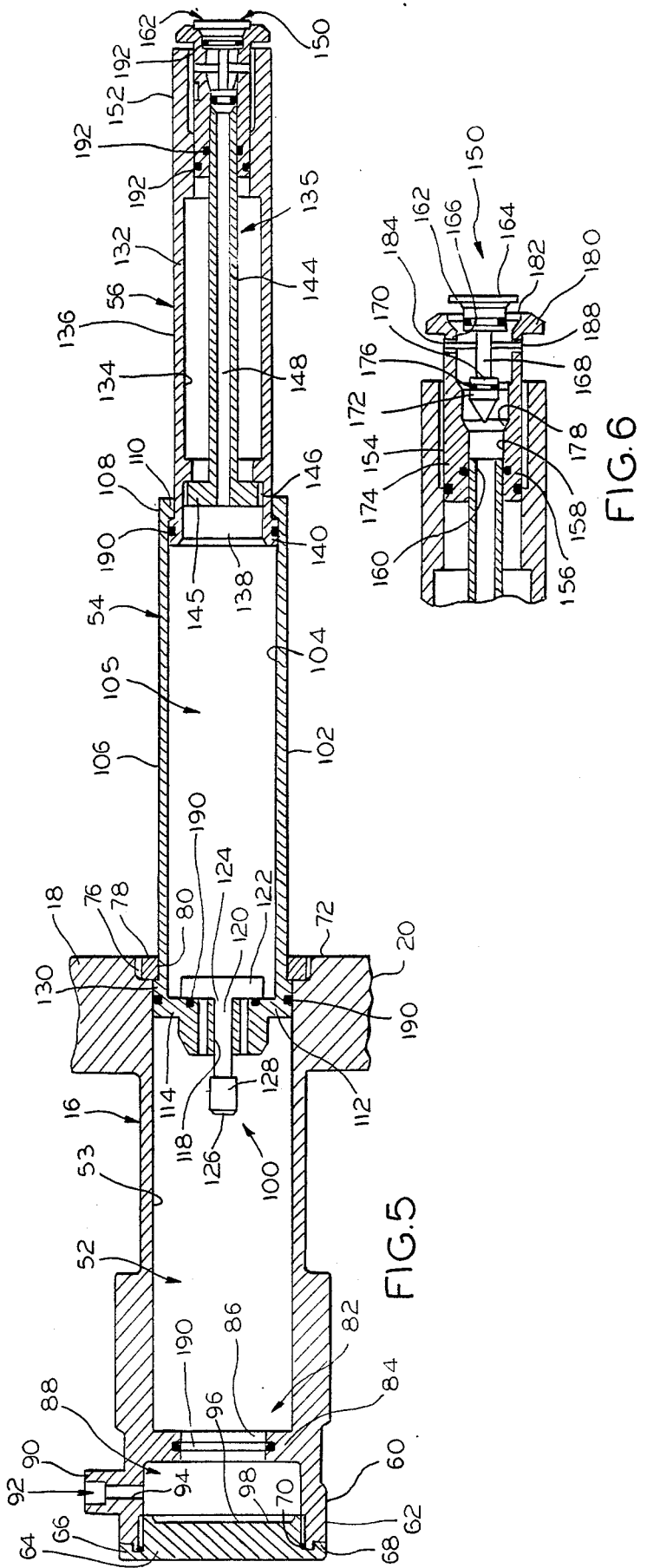

ENTRAPPED GAS EJECTOR ARRANGEMENT FOR AIRCRAFT STORE RACKS

This invention relates to military type aircraft racks for releasably securing to the aircraft, stores, such as conventional and nuclear and weapons or the like, and more particularly to a store rack ejector arrangement for thrusting, in flight, the store away from the aircraft and beyond the aircraft's air stream envelope, once the store has been released from the rack.

This invention is directed to an improvement over the ejector arrangement of Earl K. Takata et al. application Ser. No. 026,039, filed Mar. 16, 1987 now Pat. No. 4,850,553 granted Jul. 25, 1989.

So-called bomb or missile racks that are applied to military type aircraft to releasably secure to the aircraft stores such as conventional or nuclear weapons have application in aircraft bomb bays for bomb type weapons, and under the wing applications for releasably retaining missiles and rockets to the aircraft prior to release. One such rack arrangement is the U.S. Aircraft type MAU-12B/A bomb ejector rack assembly that is the subject of Technical Manual T.0.11B29-3-25-2, published under the authority of the Secretary of the Air Force Mar. 26, 1979. This bomb rack is designed to suspend on aircraft, and forcibly eject, or permit free-fall release, conventional or nuclear stores, up to and including those in the 5,000 pound weight class (as defined in Table 1 of Military Specification MIL-A-8591).

Reference is made to U.S. Pat. No. 4,049,222, granted Sept. 20, 1977, and U.S. Pat. No. 4,050,656, granted Sept. 27, 1977, to Paul F. Peterson, for illustrations of bomb racks of the type to which the invention relates; see also U.S. Pat. No. 4,075,929, granted Feb. 28, 1978 to the said Paul F. Peterson, relating to a three stage ejector device for use in connection with bomb racks of the type to which the invention relates. Reference is also made to LaRoe U.S. Pat. No. 3,677,506, granted Jul. 18, 1972. The disclosure of all of these patents are incorporated herein by this reference.

Store racks of the type indicated are designed to releasably secure to the aircraft conventional or nuclear weapons in the form of bombs, rockets or missiles, as well as other stores, such as external fuel tanks, etc. Such racks may be designed for mounting internally of the aircraft, as in the aircraft bomb bay, for either single store holding action and release functions, or as part of a rotary launch arrangement, or the rack may be applied to under the wing applications for providing for releasably securement of the store to the aircraft and simultaneous release and ejection of the store from the aircraft.

Such bomb racks typically include at least one set of shackle assemblies involving pivotally acting hooks that respectively engage spaced lugs of the store to releasably secure the store to the aircraft, two side plate assemblies, mounting channel assemblies, a pair of fore and aft ejector assemblies (commonly known as "ejectors"), a gas tube assembly, a breach assembly to which the cartridges that form the source of the actuating ballistic gas are applied, arming solenoids, and a wire harness assembly. Basically the shackle assemblies are actuated and set to dispose their hooks in closed positions to receive the store lugs and secure the store to the aircraft, and when the store is to be released in flight, and assuming that the rack has been armed to forcibly eject the store on its release by the rack, an electrical signal energizes the arming solenoids that in turn ignite the breach assembly cartridges that generate in an instantaneous manner the high pressure ballistic gas that is to operate the rack to both release and simultaneously eject the store away from the aircraft, and specifically, out of the aircraft air stream envelope.

Conventionally, part of the ballistic gas so generated is connected to the rack mechanism that shifts the shackle assembly hooks to their open positions, and the rest of the ballistic gas is connected to the rack ejectors that then operate to thrust the store away from the aircraft (where the rack is armed for forcible ejection of the store).

The present invention is concerned with the arrangement of the rack ejectors, and specifically with each rack ejector that is at the rack fore and aft positions, that are relied upon to forcible eject the store from the aircraft. Specifically, the present invention is directed to reducing the peak ejection forces applied to the store in view of the complex electronic circuitry or the like with which the store may be equipped at the present time.

Prior to the ejector arrangement disclosed in the above identified Takata et al. patent application conventional rack ejectors, which typically involved a single piston ballistic actuator, when actuated to forcible eject the store, such as a bomb, missile or rocket (which has also been released by the same signal that generates the high pressure ballistic gas that is transmitted to the rack ejectors for ejection purposes), effect a high pressure force application to the store, fore and aft of the rack, with this high pressure force application tapering off as the ejection procedure or thrust action on the store proceeds; that is to say, the thrust action being applied to the store, to thrust the store away from the aircraft, tapers off as the rack ejectors shift from their dormant relation to their fully extended relation. This leaves to chance that the store will be thrust sufficiently forcibly away from the aircraft so that the store will be pushed beyond the aircraft's air stream envelope at the fast operational speeds of modern military type aircraft (Mach 1 or greater).

A principal object of the present invention is to provide a store rack dual piston all ballistic gas actuated ejector, for use at the rack fore and aft ejector positions, that, when the store rack is actuated to both release and eject the store, operate to eject the store in an operational sequence that effects reduction of the ejection force peaks that the store experiences from the unbalanced outwardly acting force that is needed for fail-safe thrusting of the store from the aircraft's air stream envelope, and at the high speeds current high performance aircraft are capable of travelling (exceeding Mach 1).

Another principal object of the invention is to provide a store rack dual piston ejector for incorporation at the fore and aft ejector positions of conventional store racks of the type indicated, which ejector involves a telescoping multipiston assembly that in the dormant state of the ejector remains in fully retracted telescoped relation within the store rack until and unless the store is to be released in flight using the store rack to which it is connected, in which case the store rack ejectors are actuated and simultaneously function automatically in a smooth operational sequence in effecting release of the store and ejecting same from the aircraft envelope, utilizing a full ejector stroke that generally applies to the store the unbalanced force that is required to fail-safe push the store beyond the aircraft's air stream envelope, even when the aircraft is travelling at speeds exceeding Mach 1, with the ejectors of the rack being readily reset for similar use when the aircraft has returned to port and has landed.

Other objects of the invention are to provide a store rack dual piston ejector for use at the fore and aft ejector positions of the rack that accommodate indefinite retention of the store on the aircraft through the rack shackle mechanism or mechanisms indefinitely, and with consistent reliability, but when in-flight release and ejection of the store is to occur, the rack ejector mechanism will reliably operate, using the usual ballistic gas initiator equipment to actuate same to effect ejection of the store away from the aircraft, to provide a store rack ejector arrangement that effects the trapping within the ejector of a portion of the high pressure ballistic gas for in-flight store ejection by applying a portion of the ejection thrust involved to the store through a gas cushion, shock absorber fashion, to provide a store rack ejector arrangement that is economical of manufacture, to provide a store rack ejector arrangement that permits the store rack to be utilized to releasably secure the store to the aircraft for extended periods, which periods may, in addition to normal flight time for a particular flight, also include multiple take offs and landings, prior to in-flight launching of the store, and that, when the store is to be launched, the rack ejector mechanisms operate in a fail-safe manner to effect a gentle but firm store ejection from the aircraft free of the aircraft's air stream envelope, but in a manner that will not disturb complex electronic circuitry or the like that may be involved in the ejected store.

In accordance with the invention, the store rack fore and aft ejectors are of mirror image arrangement and each comprises a dual piston telescoping assembly that includes an elongate housing, with which the usual rack sway braces at the fore and aft positions are integral, and which defines an internal chamber extending longitudinally of the housing and mounting in said chamber an outer piston and an inner piston that is disposed within the outer piston.

The internal chamber of the respective ejector housings and the inner and outer pistons received in same are in telescoped substantially coaxial dormant relation in the normal installed relation of the rack, with the outer piston of the respective housing chambers being arranged to receive high pressure ballistic gas that is supplied to the ejector housing involved, on release and ejection of the store, from the source of ballistic gas with which the store rack is equipped. The arrangement involved results in the outer piston being biased against ejecting movement in its retracted position, while the inner piston moves to its extended relation relative to the outer piston, after which the outer piston moves outwardly of the ejector housing chamber to its fully extended relation relative to the ejector housing, while operating to trap the high pressure ballistic gas that has been received in its chamber, whereby the inner and outer pistons of the respective ejectors act in the manner of shock absorbers for further application of the ejecting force to the store.

The lock key arrangement of said Takata et al. application is eliminated, with the ejection action provided being all gas induced, and with the store experiencing further ejection that is cushioned by the trapped gas of the respective ejectors involved. The trapped gas column involved compresses the gas shock absorber fashion, and then returns the ejector to full extension before the full ejector thrust applying stroke is completed.

The rack ejector arrangements may be returned to their dormant positioning for equipping the aircraft with fresh stores and recharging of the rack when the aircraft has returned to and landed at an airport.

The invention contemplates that the inner piston of each ejector may be equipped with a valve assembly for venting to the atmosphere the ballistic gas that actuates the respective rack ejectors involved, for permitting manual return of the ejectors to their dormant relation within the ejector housings, for reuse in the manner indicated.

Other objects, uses, and advantages will be obvious or become apparent from a consideration of the following detailed description and the application drawings in which like reference numerals indicate like parts throughout the several views.

Figure 2:
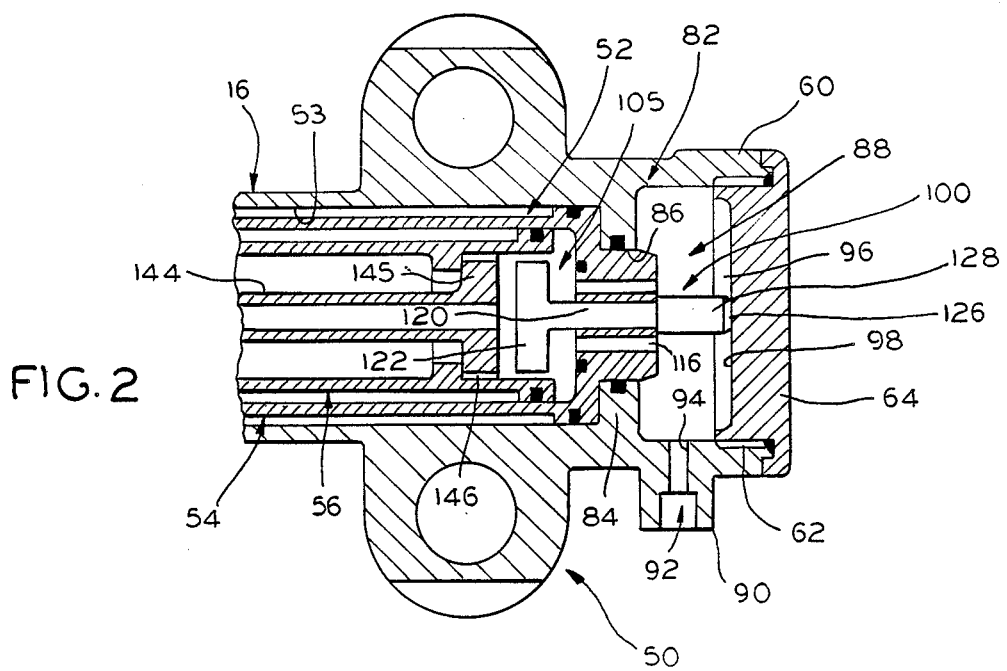

In the drawings:

FIG. 1 is a top plan view of a store ejector that corresponds in location to the aft actuator mechanism shown in FIG. 1 of said Takata et al. application, and while the exterior of the ejector housing involved is conventionally configured to the extent shown, the ejector illustrated is arranged internally in accordance with the present invention;

FIG. 2 is a fragmental sectional view taken substantially along line 2—2 of FIG. 1, indicating one way in which the ejector mechanisms of this application may be exposed to the high pressure ballistic gas conventionally generated when the store rack involved is to be actuated to both release the store and eject same, utilizing for the rack fore and aft ejectors the ejectors herein-disclosed, with the ballistic gas inlet porting to the ejector shown in FIG. 2 being shown diagrammatically in stud form to simplify the drawing;

FIG. 3 is a sectional view substantially along line 3—3 of FIG. 1 and shows the ejector of this application for its full length in its retracted, dormant, form, showing, for illustrative purposes, the ballistic gas inlet porting appearing in FIG. 2;

FIGS. 4 and 5 are diagrammatic views similar to that of FIG. 3, but with the ejector housing conventional sway braces broken away, illustrating the inner and outer pistons of the invention ejector at succeeding stages during the ejector stroke of the ejector herein disclosed; and FIG. 6 is a fragmental view of the projecting end portion of the inner piston as shown in FIGS. 4 and 5, that in the form illustrated is equipped with a stemmed venting valve arrangement that automatically exhausts the ballistic gas from the ejector, after it has served its store ejecting purpose, and for manual return of the inner and outer pistons to the dormant relations shown in FIG. 3 when the aircraft has landed to re-equip its stores, etc.

However, it is to be distinctly understood that the drawing illustrations referred to are provided primarily to comply with the disclosure requirements of the Patent Laws, and that the invention is susceptible of embodiments and modifications that will be readily apparent to those skilled in the art, which are intended to be covered by the appended claims.

GENERAL DESCRIPTION

Reference may be had said Takata et al. patent application for a description and illustration of a store rack ejector assembly arranged in accordance with the afore cited references to suspend or mount on aircraft, and forcibly eject from same, conventional or nuclear stores; the disclosure of said Takata application is also hereby incorporated herein by this reference.

As disclosed in said Takata et al. application, store rack assemblies of the type indicated include the conventional two side plate assemblies, the mounting channel assemblies, the shackle assemblies, the breach assembly, the arming solenoids, and the wire harness assembly (all of which are not shown in the drawings of the present application), in addition to the fore and aft ejectors that are also diagrammatically illustrated in said Takata et al. application in association with the conventional ballistic gas tube assembly.

As is conventional, the respective fore and aft ejectors are mirror images of each other, but are otherwise identical, and form the basic disclosure of said Takata et al. application.

In accordance with the present invention, the ejector assemblies are arranged in accordance with the showing of FIGS. 1-6 of the present application.

The drawing Figures of the present application, as indicated, illustrate the rack aft ejector 12, but, of course, the fore ejector to be applied to any given rack is, as indicated, will be the same but in the usual mirror image form of what is disclosed in FIGS. 1-6. The disclosure of this application pertaining to the rack ejectors is thus confined to aft ejector 12, since the fore rack ejector will thus be essentially the same as ejector 12 (to avoid unnecessary duplication).

Thus, the ejector 12 that is illustrated in the drawings of the present application includes housing 16 that is configured externally in a conventional manner to define the usual sway brace integral arms 18 and 20 that, as disclosed in said Takata et al. application, are each equipped with a conventional adjustable screw set brace device that is fully disclosed in said Takata et al. application. The rack fore ejector mechanism (not shown in the present application) is to be similarly arranged.

When a store, such as a missile 34, is applied to the rack assembly involved, the usual operating mechanism of the assembly is operated to apply the mechanism shackle hooks to spaced lugs of the store (not shown but see U.S. Pat. Nos. 3,677,506, 4,049,222, and 4,050,656 that have been referred to) with which the missile or other similar store is conventionally equipped for the purpose of holding the store in place. At this time the rack fore and aft ejector adjustable foot devices that have been referred to are adjusted to apply their feet against the exterior of the missile to hold it against sway, with the nut and bolt assemblies involved being tightened against the respective sway brace arms to lock the nut and bolt devices in place, as fully seated, in sway preventing relation against the missile or other store that is to be carried by the store rack assembly involved.

As is conventional, the basic conventional store rack involved will be equipped with the usual gas tube assembly that is connected to the conventional breach assembly (not shown) to which the usual cartridges are applied for forming the operating ballistic gas that is conventionally generated by the aforementioned cartridges when the store is to be released in flight, upon an electrical signal being transmitted to the ballistic gas tube assembly whereby the ballistic gas in question is generated and directed through suitable conduiting to simultaneously unlock the shackle assemblies and activate the rack ejector mechanism 12 and its fore ejector mate, for thrusting the store carried by the rack assembly in question away from the aircraft.

It is also pointed out that in the normal application of a store rack to an aircraft, the rack is applied to the aircraft so that when the aircraft is in flight, the rack is essentially horizontally disposed so that the ejector housings of same (for instance, the housing 16) are essentially in upright position, with the upper ends of the ejector mechanisms at the upper side of the rack assembly involved.

Referring now more specifically to FIGS. 1-6, the aft ejector 12 and the corresponding fore ejector for a particular store rack comprise a telescoping assembly 50 that for the aft ejector mechanism 12 includes the housing 16, with the fore ejector of the rack being identically arranged but in mirror image fashion insofar as the exterior of the ejector housing is concerned (the remainder of the fore ejector being the same as the illustrated telescoping assembly 50).

As indicated in FIGS. 2 and 3, the housing of an assembly 50, represented by the housing indicated at 16 in the drawings, is formed internally to define elongate chamber 52 having an inner surfacing 53, with the housing chamber 52 having received in same an outer piston 54 and an inner piston 56 received in the outer piston 54, with the basic components involved in the ejector 12, in the dormant relation of same, being in the coaxial, telescoped, relation that is indicated in FIGS. 2 and 3.

Where indicated in FIGS. 1-3, the upper end 60 of the housing 16 is internally threaded as indicated at 62 for threadedly receiving a closure plug 64 that is flanged as at 66 for seating against the housing end 68, and against suitable O ring seal 70. The plug 64 in form shown is provided with two pair of equally spaced recesses 72 and 73 (see FIG. 1, with recesses 23 being omitted from the showing of FIG. 3), for receiving the prongs of a conventional turning tool of any appropriate type for threading the plug 64 into sealing relation with the housing 16 at the end 60 thereof.

SPECIFIC DESCRIPTION

As will be readily understood by those skilled in the art, the housing 12 for both the fore and aft ejector assemblies is integral with the respective sway brace arms 18 and 20. The housing chamber 52 at its lower end 72 (see FIG. 3) terminates at counterbore 74 that is provided with suitable threading where indicated at 76 for annular nut 78 that is received therein, in which the outer piston is reciprocably mounted, the nut 78 defining a bore 80 for this purpose.

The housing 12 at the upper end 82 of chamber 52 is formed to define internal shoulder 84 that is annular in nature and defines central opening or aperture 86 for the hereinafter described cooperation with outer piston 54. Between the shoulder 84 and plug 64, the housing is formed to define ballistic gas receiving chamber 88 to which the ballistic gas may be communicated in any suitable manner, which normally would be a communication used with conventional racks of the type referred to in said Takata et al. application. For purposes of illustration, as shown in FIGS. 2 and 3, the cylinder 16 is shown equipped with a stud 90 apertured as at 92 for application thereto of a suitable externally threaded fitting which communicates with passage 94 that leads to chamber 88. It will be understood, of course, that as a practical matter the stud 90 can be at any location about the periphery of the chamber 88, and that as a practical matter, the entrance to the chamber 88 will be defined by the usual entrance passage used for these racks, such as the entrance aperture and passage illustrated for this purpose in the Takata et al. application.

Further in accordance with this invention, the plug 64 is formed with indentation 96 defining planar surfacing 98 that functions as a stop surface for the ballistic gas entrapment valve 100 that forms a part of the outer piston 54.

The outer piston 54 is in the form of a cylinder 102 defining internal cylindrical surface 104 forming chamber 105, and external cylindrical surface 106, the latter being in free sliding relation to the bore 80 of nut 78. The outer piston 54 at its open end 108 defines internal shoulder 110 that in operation is adapted to be engaged by the inner piston 56 (see FIGS. 4 and 5 that are described hereinafter).

The outer piston 54 also includes adjacent its upper end 112 a base or end wall 114 that is formed with a multiple of ports 116 (for instance six in number) of equal size and are centered equidistant from the axial center of the outer piston 54, as well as a central bore 118 that slidably receives the gas entrapment valve 100 that is carried by the outer piston 54. As indicated in FIGS. 2 and 3, the valve 100 is of the headed stem type, comprising stem 120 that carries head 122 at its end 124 and defines stop surface 126 at its end 128, the latter being enlarged with respect to the transverse size of the outer piston central bore 118 such that the valve 100 cannot be thrust open beyond the position indicated in FIGS. 2–4 and into the chamber 105 defined by outer piston 54.

As is also indicated in FIGS. 2 and 3, the stub portion 115 of the outer piston end wall or base 112 is proportioned for slip fit entry into central aperture 86 of housing 16 when the outer piston 54 is moved to its dormant position shown in FIGS. 2 and 3, whereby the end 112 of the outer piston 54 seats against collar 84, in which position the end surface 126 of valve stem 120 engages the stop surface 98 of plug 64 to space the valve head 122 from the ports 116 whereby the high pressure ballistic gas entering the chamber 88 has access to outer piston chamber 105 through the respective ports 116. Outer piston 54 adjacent its end wall 112 is also formed with external shoulder 130 that is to engage nut 78 during the ejecting action of the ejector mechanism 12 (see FIG. 5).

The inner piston 56 comprises cylinder 132 formed to define a multidiameter internal surface 134 forming internal chamber 135, and external surface 136; the upper end 138 of the inner cylinder 56 is in the form of external shoulder 140 that in the ejection stroke of the ejector mechanism 12 engages the internal flange 110 of the outer cylinder (see FIG. 4).

In the form shown, the inner piston 56 is equipped with a centrally located gas evacuation tube 144 defining a head 145 that is externally threaded to cooperate with threading 146 of the inner piston cylinder 132 to dispose the tube bore 148 in cooperating relation with venting valve device 150 that is of a conventional nature, and the details of which are best shown in FIG. 6.

The vent valve device 150 is at the lower end 152 of the inner piston 56, the latter being suitably threaded as at 154 to receive the tubular valve member 156 that defines bore 158 into which the tube 144 is inserted so that its discharge end 160 is disposed adjacent the stem 65 of valve member 162 forming a part of vent valve device 150. The valve member 162 comprises a valve head 164 that is shiftably mounted in counter bore 166 of the valve member 156 that is coaxial with its bore 158. The vent valve member 162 includes a stem 168 formed with spaced ridges 170 and 172 that define a groove 174 for suitable 0 ring seal 176 that, in the sealing relation of the valve member 162, is seated in sealed relation in and with the throat restriction 178 of the bore 158, as when the ejector assembly 50 is ready for use and is disposed in its dormant telescoping relation shown in FIG. 3. The valve sleeve 156 is formed to define annular flange 180 that seats against the store exterior in the dormant relation of the ejector assembly 50, which flange 180 is recessed as at 182 to receive the vent valve head 164 in the retracted position of the valve member 162.

As indicated in FIGS. 3 and 6, the sleeve 156 has applied to same a pair of opposed centering screws 184 and 188 that are to be seated in guiding relation with and against the stem 168 of the valve member 164, as indicated in FIGS. 3 and 6.

Appropriate seals, such as suitable 0 ring sealing devices, may be applied where indicated by the reference numeral 190 to the housing 16, the outer piston 54, and the inner piston 56, to provide adequate sealing at these locations of the assembly 12.

As to the vent valve device 150, suitable sealing devices 192, such as 0 ring seals, may be applied to the vent valve device 50 where indicated at 192 to achieve adequate sealing, though such seals 190 and 192 may be of any suitable type that will provide adequate sealing for the ejector 12.

The operation of the ejector 12 is as follows:

The rack assemblies of which a pair of the ejectors 16 are a part are assembled in accordance with standard practices, with the fore and aft ejector mechanisms 12 disposed so that their telescoping piston assemblies 50 are in the dormant, retracted, telescoped modes shown in FIG. 3. This is the condition that the ejectors 16 are in when the rack they form a part of have secured to same a missile or other store; the conventional shackle assemblies of the rack are operated conventionally to effect the grasping of the store lugs, and the rack sway arms, including the arms 18 and 20, are suitably set against the missile exterior to prevent in-flight sway of the store, and to seat the vent valve device 150 against the store, which disposes the stem 168 of valve member 162 in the sealing position shown in FIG. 3.

When the missile or other store is to be released in flight, the rack carrying same is electrically actuated in a conventional manner to provide the ballistic gas flow suggested in the hereinbefore identified Technical Manual, which effects release of the rack from the store lugs. The ballistic gas flow also proceeds to the chamber 88 of the rack ejector mechanism 16, and as the positioning of the outer and inner pistons 54 and 56 within the ejector housing 16 brings the stem 120 of entrapment valve 100 into engagement with the housing top plug 64, as indicated in FIGS. 2 and 3, the head 122 of the entrapment valve 100 is spaced or separated from the gas flow ports 116, thus permitting the ballistic gas to enter the cylinder chamber 105 of the outer piston 54. The high pressure ballistic gas then acts two ways in accordance with the present invention, it acts to move the inner piston 56 toward and to the position indicated in FIG. 4, and also biases the outer piston 54 against shoulder or end wall 84 of the housing 16. As the shoulder 140 of the inner piston 56 engages the flange 110 of outer piston 54, the outer piston 54 is biased to move in the ballistic ejecting direction by both the gas pressure within chamber 105 (which has now been greatly enlarged) acting on the head end of valve 100, and the movement inertia of the inner piston 56. As the outer piston 54 moves in the ejecting direction, the gas entrapment valve 100 is separated from the housing plug 64 and, being proportioned for this purpose, consistent with disclosure of the instant application closes under the action of the gas pressure in the chamber 105, so that the pistons 54 and 56 thereafter move together in the ejecting direction to apply the needed thrust to the store, until the nut 78 is engaged by the outer piston shoulder 130. However, the closure of the gas entrapment valve 100 traps high pressure ballistic gas within the chamber 105 so that the additional thrust that is applied to the store being ejected by the pistons 54 and 56 is applied with a shock absorber action, which involves the gas entrapped in the chamber 105 of the outer piston 54 being compressed as the inertia of the store retracts the inner piston 56 within the chamber 105, with the resulting shock absorbing action intended for the ejector 12, and with the entrapped gas functioning to return the inner piston 56 to the outer end 108 of the outer piston cylinder 132 as the thrust action of the ejector 12 on the store ends in the fully extended position of the cylinders 54 and 56 from housing 16 (see FIG. 5).

At this point, the conventional vent valve device 150 opens to the position of FIG. 6 to sequentially vent the ballistic gas pressure from chamber 105 and then from chamber 52 due to the discharge of the ballistic gas in question from chamber 52 through ports 116 that will be permitted due to the fact that the ballistic gas pressure of chamber 105 that formerly acted on the valve head 122 has been vented, thus permitting the gas entrapment valve 100 to shift to the right of FIG. 5 to provide for the gas venting of chamber 52 that has been mentioned.

The ejector 12 can be specifically arranged in connection with store weights in the range of from about 550 pounds to about 3,300 pounds, and to have ejecting movement (when the ejecting action of the ejector is completed), in a range of from about 10 to about 40 feet per second, depending on the particular type of store to be ejected. However, it is preferred that the ejector be arranged so that the internal diameter of the housing chamber 52 in which the outer piston 54 operates is approximately twice that of the internal diameter of the entrapment cylinder 105.

While the conventional vent valve device 150 is preferred, since if used this provides for complete evacuation of the ballistic gas from the ejector mechanism 12 for easy manual return of the pistons 54 and 56 to the dormant retracted position of FIG. 3 after the aircraft has returned for re-equipping or re-arming as the case may be, it is within the scope of this invention that the valve device 150 may be dispensed with and the inner piston 56 be formed to be closed at its end 152, with suitable provision being made to release the gas pressure within the ejector 12 on return of the aircraft for re-equipping or re-arming as the case may be.

The ejector arrangement of this invention thus provides for entrapment and compression of the ballistic gas that is within the outer piston 54, and also effects the application of further ejection pressure of the inner piston 56 that is transmitted to the store by virtue of the compressed gas involved. The store thus experiences outward thrust energy applied thereto of an increased type while limiting the peak thrust that is actually applied to the store to avoid undue shock being applied to complicated electronic circuitry and the like that may be involved in the store that has been released. The result is that a gentle ejection action is applied to the store in a manner that eliminates the application of force peaks to the store.

While the pressure of the ballistic gas admitted to the ejector chamber 88 may be on the order of 11,000 psi, and the pressure on the ballistic gas entering chamber 105 may be almost as great, the ballistic gas that is trapped in the outer piston chamber 105 during the ejecting action will be at a greater pressure than the pressure of the gas entering chamber 88 due to the compression of same that is involved, this results in an increase in thrust applied to the store. The pressure of the entrapped ballistic gas in chamber 105 returns the piston 56 to its maximum extended relation with respect to piston 54, when the ejector components have achieved their fully extended relation indicated in FIG. 5.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. In a ballistic gas operated ejector mechanism for store rack assemblies for ejecting a store from aircraft in flight, and ballistic gas actuated from a ballistic gas supply source, said ejector mechanism comprising:

a telescoping assembly including an elongate housing defining an upper end, and a lower end, and an internal chamber extending longitudinally thereof, and mounting in said chamber an outer tubular piston, and an inner piston within said outer piston, said housing chamber and said pistons having a telescoped substantially coaxial dormant relation, said pistons having like ends of same disposed adjacent said lower end of said housing in said dormant relation, and said pistons having the other ends thereof disposed above said like ends thereof in said dormant relation, said housing adjacent said upper end of same including an internal shoulder defining a seat, for said other end of said outer piston, said housing shoulder having an opening formed therein extending longitudinally of said housing, said outer piston at said other end thereof defining a stub portion proportioned for substantially complementary fit within said housing shoulder opening in said dormant relation of assembly, said housing defining, between said lower end of same and said shoulder, said internal chamber thereof, with said housing defining an internal chamber being proportioned for slidably mounting said outer piston therein for downward movement of same relative to said housing to extended relation with respect to said housing, said outer piston, between said ends thereof, defining an internal chamber proportioned for slidably mounting said inner piston therein for movement of same to extended relation with respect to said outer piston, said outer piston shiftably mounting a headed stem valve member in said stub portion thereof, and said outer piston stub portion defining a plurality of ballistic gas ports therethrough about said stem valve member, said headed stem valve member comprising a head portion and a stem portion, with said head portion of said valve member being disposed within said chamber of said outer piston for closing said outer piston ports when disposed against said outer piston stub portion, and said stem portion of said valve member projecting through said outer piston stub portion, said housing upper end being adapted to be connected to a source of ballistic gas and including means for exposing said outer piston stub portion to the ballistic gas when the source of the ballistic gas supplies the ballistic gas to said housing, said housing upper end including stop means for engaging said valve member stem portion for disposing said head portion thereof short of closure of said outer piston ports when said assembly is in said dormant relation, said valve member being proportioned for shifting said valve member to close said outer piston ports when said outer piston internal chamber is ballistic gas pressurized and said outer piston has sufficiently moved toward said extended relation thereof to separate said valve stem portion from said housing stop means, and including stops for precluding said pistons from moving away from said housing other end beyond their respective extended relations, whereby, on ballistic gas being admitted under pressure to said housing at said exposing means when said housing and said pistons are in said dormant relation, ballistic gas passes through said outer piston ports to bias said outer piston against said seat, thrust said inner piston to said extended relation thereof with respect to said outer piston, and pressurize said outer piston chamber, and when said inner piston reaches said extended relation thereof relative to said outer piston, said outer piston moves toward said extended relation thereof relative to said housing, to separate said valve member stem portion from said housing stop means and permit the ballistic gas pressure then in said outer piston chamber to bias said headed stem valve member to close said ports, for trapping ballistic gas under pressure in said outer piston chamber, whereby the trapped ballistic gas acts resiliently in compression, under the inertia of the store being ejected, to bias said inner piston to apply thrust to the store up to said extended relation of said outer piston with respect to said housing.

2. The ejector mechanism set forth in claim 1 wherein:

said inner piston is valved for venting the ballistic gas therefrom when said outer piston is in said extended relation with respect to said housing, whereby said pistons may be manually retracted to be disposed in said dormant relation on venting of the ballistic gas therefrom.

3. The ejector mechanism set forth in claim 1, wherein:

said pistons are substantially masked by said housing when in said dormant relation.

4. The ejector mechanism set forth in claim 1, wherein:

said outer piston stub portion and said headed stem valve member are in coaxial relation to said housing chamber and said pistons.

5. The ejector mechanism set forth in claim 1, wherein:

said housing defines a ballistic gas expansion chamber open to said outer piston ports, and said housing stop means comprises a housing closure plug removably affixed to said housing.

6. The ejector mechanism set forth in claim 1, wherein:

said housing chamber and said outer piston chamber have transverse cross-sectional areas of approximately two to one.

7. The ejector mechanism set forth in claim 5, wherein:

said valve member stem portion includes an enlarged end portion proportioned to dispose said valve member short of closure of said outer piston ports when said assembly is in said dormant position.

* * * * *